United States Patent

Furman

[15] 3,673,249
[45] June 27, 1972

[54] PROCESS FOR PREPARING TERTIARY AMYL UREA

[72] Inventor: Frank Meritt Furman, Somerville, N.J.
[73] Assignee: American Cyanamid Company, Stamford, Conn.
[22] Filed: June 9, 1970
[21] Appl. No.: 44,898

[52] U.S. Cl. .................................260/553 R, 260/583 R
[51] Int. Cl. .........................................C07c 127/14
[58] Field of Search .................................260/553 R

[56] References Cited

UNITED STATES PATENTS 2,247,495    7/1941    Harvey et al. .....................260/553 R

OTHER PUBLICATIONS

Urbanskaya, Zhurmal Obshchei Khimi, T. 29, pages 174– 179 (1959) Q 1Z6

*Primary Examiner*—Leon Zitver
*Assistant Examiner*—Michael W. Glynn
*Attorney*—Edward A. Conroy, Jr.

[57] ABSTRACT

This disclosure describes a process for the preparation of tertiary amyl urea which is useful as an intermediate in the preparation of 1-cyano-3-tert.-amylguanidine, a hypotensive agent.

3 Claims, No Drawings

PROCESS FOR PREPARING TERTIARY AMYL UREA

BRIEF SUMMARY OF THE INVENTION

This invention relates to a novel process for the preparation of tertiary amyl urea. More particularly, it relates to the condensation of tertiary amyl alcohol with urea in the presence of sulfuric acid as condensing agent; said sulfuric acid being of 80–90 percent strength, preferably 85–90 percent strength.

DETAILED DESCRIPTION OF THE INVENTION

Tertiary amyl amine is an important intermediate in the manufacture of the hypotensive agent 1-cyano-3-tert.-amylguanidine, which is the subject of U.S. Pat. No. 3,308,022 to Cummings et al. It is prepared by the interaction of tertiary amyl amine hydrochloride with sodium dicyanamide in a lower alkanol solvent. Tertiary amyl amine can be prepared generally by the formation of tertiary amyl urea from tertiary amyl alcohol and urea in the presence of concentrated sulfuric acid, followed by hydrolysis of the tertiary amyl urea with strong base to afford the amine, as set forth below:

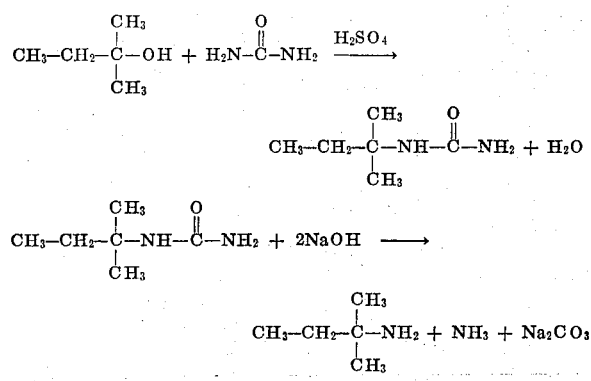

U.S. Pat. No. 2,247,495 to Harvey et al. describes the synthesis of tertiary amyl urea (Example 2 therein). One mole of urea, 2 moles of concentrated (above 94 percent) sulfuric acid and 2 moles of tertiary amyl alcohol (99 percent pure) are reacted at a temperature below about 70° C. to produce the tertiary amyl urea. Significantly, the patent discloses the use of sulfuric acid having a concentration greater than 94 percent. A procedure for the preparation of tertiary butyl urea is described in *Organic Syntheses*, Coll. Vol. III, pp. 151–156. As shown therein, 1.98 moles of concentrated sulfuric acid, sp.gr. 1.84, which corresponds to greater than 96 percent concentration, 1 mole of urea and 2 moles of tertiary butyl alcohol are reacted at a temperature between 20°–25° C. to afford tertiary butyl urea in 31–33 percent yield.

Similarly, the above Organic Syntheses reference, p. 154, describes the procedure used for the hydrolysis of tertiary butyl urea to tertiary butyl amine. A similar procedure is described (see Note 9 therein) for the synthesis of tertiary amyl amine in 87 percent yield from tertiary amyl urea.

When tertiary amyl urea is prepared according to the procedures described in either U.S. Pat. No. 2,247,495 or Organic Syntheses, and the product then hydrolyzed in accordance with the Organic Syntheses technique, the crude amine product always contains appreciable amounts (as much as 3 percent is obtained using the standard Organic Syntheses procedure even if the starting tertiary amyl alcohol is greater than 99 percent pure) of other amine impurities, principally tertiary butyl amine. The purity of the tertiary amyl amine used in the synthesis of 1-cyano-3-tert.-amylguanidine is critical and must not contain more than 0.2 percent of amine impurities other than ammonia. Thus, it has been necessary to resort to time consuming and expensive fractional distillation to remove these impurities from the crude tertiary amyl amine reaction product.

It has now been discovered that tertiary amyl amine can be prepared in higher yield (based on the alcohol) and a purity of at least 999 parts of tertiary amyl amine to one part of tertiary butyl amine, without fractional distillation, if the tertiary amyl urea used in the synthesis is made using sulfuric acid of 80–90 percent strength, preferably 85–90 percent. It is indeed surprising and unexpected that the sulfuric acid concentration is so critical in reducing the level of impurity in the tertiary amyl amine obtained by the subsequent hydrolysis of the tertiary amyl urea.

In accordance with this invention 1.0 to 1.6 moles, preferably 1.15 to 1.40 moles, of urea is slowly admixed with 2 moles of 80–90 percent sulfuric acid at a temperature below about 70° C. To this mixture at 15°–55° C. is then added 1.0–2.5 moles of tertiary amyl alcohol, preferably 1.3 moles, containing less than 1 percent of other alcoholic impurities. The reaction time can vary from about one-half hour to about 30 hours and is dependent on the temperature at which the reaction is run. The preferred reaction temperature is 15°–55° C. and agitation of the reaction mixture is advantageous. Higher reaction temperatures require shorter reaction times. In fact, longer reaction times at the higher reaction temperatures result in lower yields. The tertiary amyl urea can be obtained from the reaction mixture either by drowning in water, followed by neutralization with caustic or ammonia, or drowning directly into an aqueous basic solution. The product is isolated by filtration, washed with water, and dried. The tertiary amyl urea so obtained has a m.p. of 152°–156° C.

The tertiary amyl urea is hydrolyzed in accordance with the procedure described in Organic Syntheses, Coll. Vol. III, pp. 154–155, and yields tertiary amyl amine containing less than 0.1 percent tertiary butyl amine.

The invention will be described in greater detail in conjunction with the following specific examples.

EXAMPLE 1

Ice, 250 pounds, and 1,860 pounds of 98 percent sulfuric acid were charged to a 500-gallon glass-lined kettle. Urea, 720 pounds (uncoated prills) was added at 30°–35° C. The slurry was cooled to 21° C. and 810 pounds of tert. amyl alcohol was added. The batch was stirred for 19 hours at 21°–22° C. and drowned into a 12 percent caustic soda solution. The temperature was maintained below 25° C. during the drowning. The pH was adjusted to 7–8 with caustic soda solution and the product, tert. amyl urea, isolated on a centrifuge, washed with water, and dried. Yield of product was 59 percent.

Ethylene glycol, 4,100 pounds, water, 266 pounds and 1,210 pounds of tert. amyl urea were charged to a 1000 gallon iron kettle. To this slurry was added 1,900 pounds of 50 percent caustic soda solution. The mixture was heated at 90°–95° C. for 4 hours and the tert. amyl amine distilled from the reaction mixture, taking three cuts: a 30 pound forecut, a 780 pound center cut and a 100 pound final cut. The yield of tert. amyl amine was 81 percent, excluding that contained in the final cut. Analysis of the distillate by vapor phase chromatography showed that less than 0.02 percent of tert. butyl amine was present.

EXAMPLE 2

Urea, 295 pounds, was added to 725 pounds of 98 percent sulfuric acid at 25°–28° C. The slurry was stirred for 0.5 hour and cooled to 20° C. Tert. amyl alcohol, 662 pounds, was added at 21°–23° C., the mixture stirred for 18 hours at 19°–22° C., and drowned into a 12 percent solution of caustic soda. The temperature was maintained below 25° C. during the drowning. The pH was adjusted to 7–8, 2,650 pounds of toluene added and the mixture filtered, washed with water and dried at 60° C.

The tert. amyl urea obtained was converted into tert. amyl amine according to the procedure of Example 1. Analysis of the distillate by vapor phase chromatography showed the presence of 2–3 percent tert. butyl amine. The crude tert. amyl amine was fractionally distilled, resulting in about 80 percent recovery of tert. amyl amine having a purity of 97 percent. VPC analysis showed the presence of 0.02 percent tert. butyl amine.

This example illustrates that tert. amyl amine produced by the prior art procedure contains large amounts of tert. butyl amine impurity which must be removed by fractional distillation. In this experiment, two fractional distillations were required to reduce the tert. butyl amine content to 0.02 percent.

EXAMPLE 3

Sulfuric acid, 96 percent, 56 ml., and 11.2 ml. of water were stirred as 39 grams of urea (uncoated prills) was slowly added. The reaction mixture was cooled to about 20° C. and 109 ml. of tert. amyl alcohol was added over 0.5 hour, maintaining the temperature below 20° C. The mixture was stirred for 19 hours at 20° C. and then drowned into a solution consisting of 312 ml. of 20 percent caustic soda and 200 ml. water, keeping the temperature below 25° C. The pH was adjusted to 7–8 and stirred for 1 hour. The product was isolated by filtration to afford 14.2 grams of tert. amyl urea.

A mixture of 10 grams of tert. amyl urea, 28.8 ml. of ethylene glycol, 2.1 ml. of water and 10 ml. of 50 percent caustic soda was refluxed for 4 hours. The reaction mixture was distilled, recovering all material boiling up to 99° C. There was obtained 7.5 grams of an aqueous tert. amyl amine mixture which showed the presence of 0.03 percent tert. butyl amine by VPC analysis.

This example illustrates the use of 87 percent sulfuric acid in a laboratory preparation of tert. amyl amine using the old process of Example 2.

I claim:
1. A process for preparing tertiary amyl urea which comprises admixing urea and sulfuric acid of 80–90 percent strength at a temperature below about 70° C., adding tertiary amyl alcohol to the resultant mixture at a temperature below about 55° C., and maintaining the resultant reaction mixture at a temperature below about 55° C. for a period of time sufficient for a substantial degree of condensation to take place.

2. A process in accordance with claim 1 wherein the sulfuric acid is of 85–90 percent strength.

3. A process in accordance with claim 1 wherein the sulfuric acid is about 87 percent strength.

* * * * *